Dec. 14, 1943.   F. R. CONKLIN ET AL   2,336,531
LAMINATED GLASS
Filed July 11, 1939
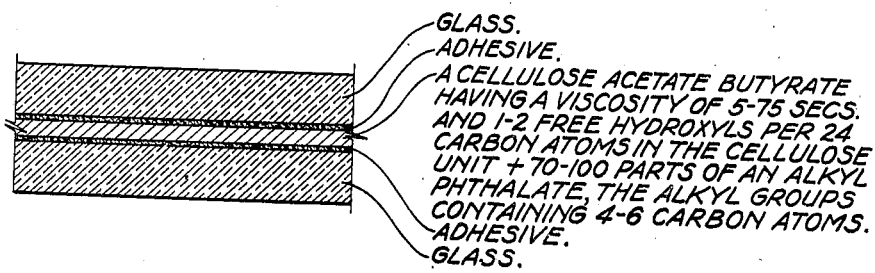
GLASS.
ADHESIVE.
A CELLULOSE ACETATE BUTYRATE
HAVING A VISCOSITY OF 5-75 SECS.
AND 1-2 FREE HYDROXYLS PER 24
CARBON ATOMS IN THE CELLULOSE
UNIT + 70-100 PARTS OF AN ALKYL
PHTHALATE, THE ALKYL GROUPS
CONTAINING 4-6 CARBON ATOMS.
ADHESIVE.
GLASS.
FREDERICK R. CONKLIN
JOSEPH D. RYAN
INVENTORS
BY
ATTORNEYS Patented Dec. 14, 1943

2,336,531

UNITED STATES PATENT OFFICE 2,336,531

LAMINATED GLASS

Frederick R. Conklin, Kingsport, Tenn., and Joseph D. Ryan, Toledo, Ohio, assignors of one-half to Libbey-Owens-Ford Glass Company, a corporation of Ohio, and one-half to Eastman Kodak Company, a corporation of New Jersey Application July 11, 1939, Serial No. 283,862

7 Claims. (Cl. 154—2.80)

This invention relates to laminated glass in which the inner layer essentially consists of a cellulose acetate butyrate containing 30–55% butyryl, having a viscosity of 5–75 seconds and 1–2 free hydroxyls per 24 carbon atoms in the cellulose unit and 70–100 parts of an alkyl phthalate, the alkyl containing 4–6 carbon atoms.

Due to its characteristic of shattering when broken, ordinary plate glass has been replaced in many uses by glass having a re-enforcing inner layer. This is particularly true of situations where there is much danger of the glass being subjected to sudden impact where shattering would cause much physical injury. Much of the laminated glass in use at the present time, however, is not capable of withstanding extreme weather conditions, such as extreme cold, on one hand, and heat on the other, rain and high humidity, on the one hand, and extreme dryness on the other. Also, the intense rays from the sun have considerable effect on many types of laminated glass. The ideal laminated glass is one that is useful and varies little throughout the whole range of conditions which are experienced in actual use.

One object of our invention is to provide a laminated glass which exhibits a high strength under the conditions of extreme atmospheric cold and extreme atmospheric heat as well as under more moderate conditions which are met with in outdoor use. Another object of our invention is to provide a laminated glass, the inner layer of which is permanent when subjected not only to extreme heat and extreme cold but also to the actinic rays of the sun. Further objects of our invention will appear herein.

The drawing shows one form of the article of the invention.

We have found that if the inner layer of laminated glass is a sheet of a stable, high butyryl, cellulose acetate butyrate, plasticized with 70–100 parts of an alkyl phthalate the alkyl containing 4–6 carbon atoms, the resulting product has a good resistance at 0° F., 70° F. and 120° F. to impact. We have also found that laminated glass, having the inner layer referred to, is much more resistant to the effects of variations in wet and dry conditions than is the cellulose ester inner layers which have previously been employed.

The alkyl phthalate may be used in the inner layer of our laminated glass in the proportion of 70–100 parts per 100 parts of cellulose ester. This proportion will be referred to herein as 70–100% of the alkyl phthalate. Some of the alkyl phthalates, which we have found to be suitable in accordance with our invention, are diamyl phthalate, di-isoamyl phthalate, dibutyl phthalate and di-2-ethyl butyl phthalate. Using 75 parts of ethyl butyl phthalate to prepare laminated glass in which the inner layer has a thickness of .025", the resulting product at 0° F. resists the impact of a one-half pound steel ball, dropped thru a distance of 16 ft. With larger proportions of plasticizer, better resistance to break is obtained. For instance, using 85 parts of diamyl phthalate per 100 parts of cellulose ester in the inner layer, a resistance by the laminated glass at 0° F. of the impact of the ball from a height of 16–24 feet was obtained and at 120° F. a fall of 23–27 feet was resisted. Using 82 parts of di-isoamyl phthalate, drops of 25 ft. with the laminated glass at 0° F., 30 ft. at 70° F. and 28 ft. at 120° F. were resisted using a one-half pound steel ball. Using 85 parts of dibutyl phthalate, the laminated glass at the temperatures listed resisted impacts of a one-half pound steel ball as follows: at 0° F. 25 ft., at 70° F. 30 ft. and 120° F. 28 ft. Using 75 parts of di-2-ethyl butyl phthalate, the laminated glass at the temperatures listed resisted impacts of a one-half pound steel ball as follows: 16 ft. at 0° F., 33½ ft. at 70° F. and 33½ ft. at 120° F. All of these results were obtained by dropping a one-half pound steel ball upon laminated glass with an inner layer having a thickness of .025". Our invention may be defined as a laminated glass in which the inner layer consists of a stable, high butyryl, cellulose acetate butyrate and an amount of an alkyl phthalate, the alkyl being of 4–6 carbon atoms, which at 0° F. will resist the impact from a height of at least 15 ft. of a one-half pound steel ball, the inner layer of the laminated glass having a thickness of .025".

The cellulose acetate butyrate, which is mixed with the alkyl phthalate, should be completely stable, as evidenced by a char point of at least 260° C. and preferably approximately 300° C. or more in contrast to the high butyryl cellulose acetate butyrates disclosed in the prior art. The cellulose esters, which we have usually employed, have been made by reacting upon cellulose with an acyl mixture containing a substantial proportion of butyric anhydride so as to assure the obtaining of a high butyryl ester. The high butyryl cellulose esters may be prepared, as described in Gardner Patent No. 2,113,301 of April 5, 1938, or as described in Malm and Kirton application Serial No. 254,492, filed February 3, 1939. The cellulose acetate butyrates, which we have employed, were stabilized in accordance with the process described and claimed in the Malm and Kirton application. Our invention is restricted to the use of esters which either have been stabilized in accordance with the process described and claimed in the Malm and Kirton application or which have a stability equivalent to the esters prepared according to that process. A cellulose acetate butyrate, which has been found to be particularly satisfactory, mixed with an alkyl phthalate as specified, for use in the inner layer of laminated glass in accordance with our invention, has a butyryl content of 35–38%, substantially the remainder of the acyl being acetyl, has been hydrolyzed approximately ⅓ of the way down to the diester and has a char point of at least 280° C.

As an example of making laminated glass in accordance with our invention, the glass plates are first thickly coated with an acetone solution of a fully esterified, low viscosity, cellulose acetate butyrate having a butyryl content approximately equal to that of the ester to be employed in the inner layer. The cellulose ester employed for this bonding layer may be prepared in accordance with the process described in Arner and Wampler Patent No. 2,071,377. A transparent sheet essentially consisting of 100 parts of a stable cellulose acetate butyrate, having a butyryl content of approximately 38% and one hydroxyl to every 24 carbon atoms in the cellulose unit, and 85 parts of diamyl phthalate, is placed between the two sheets of glass with the coated sides of the glass facing the cellulose ester sheet. The sandwich is then pressed together and finally composited in an autoclave at a temperature of about 135° C. and a pressure of 180–200 pounds per square inch. A laminated glass, having high resistance to breakage at 0° F., 70° F. and 120° F., is obtained.

Thus it may be seen that our laminated glass is particularly adapted for situations in which variable temperature conditions are experienced. For instance, temperatures up to 120° F. may be experienced in summer and temperatures down to 0° F. or lower may be met with in winter and yet the same laminated glass will have to serve its purpose in both seasons. The breaking strength of the laminated glass in accordance with our invention, is comparable at 0° F. and at 120° F. with that at 70° F. Hence our laminated glass has substantially equal utility at all atmospheric temperatures.

Because of its stability the laminated glass described herein is resistant to the effect of the sun's rays and retains its transparency and resistance to breaking in all common conditions of use. Therefore, its permanence in all kinds of weather bespeaks its suitability for use where a transparent and permanent material is desired.

The laminated glass described herein, as has been pointed out previously, stands up well when subjected to impact and is characterized by resistance to the impact of a one-half pound steel ball falling a distance of at least 15 ft. at 0°, 70° and 120° F. using an inner layer .025 in. thick. The term "resists impact" as employed herein is to be understood as meaning that rupture of the laminated glass structure does not occur from the force of the impact.

The thickness of the inner layer of the laminated glass in accordance with our invention may be varied as desired. For instance where prevention of shattering of the glass is the primary object, the resistance to impact being secondary, the inner layer may be less than .025 in. thick, such as any thickness down to .010 in. or .005 in. or less.

Any thickness from .025 in. up to .050 in. or more may be employed giving good resistance to impact. A thickness of .020–.030 in. for the inner layer has been found satisfactory, however, for most purposes and under the usual conditions in which laminated glass is to be used, it is preferred to employ an inner layer of that thickness.

Our new laminated glass is outstanding in that it resists much greater impact at 0°, 70° and 120° F. than does laminated glass in which the plastic sheet is composed of cellulose nitrate or cellulose acetate of equal thickness; this is readily apparent from the fact that laminated glass employing a sheet of cellulose nitrate or cellulose acetate as the plastic inner layer will, at 0° F., resist the impact of a one-half pound steel ball from a height no greater than four to five feet, regardless of the percentage of alkyl phthalate incorporated as a plasticizer in the plastic sheet.

We claim:

1. Laminated glass containing an inner layer essentially consisting of 100 parts of cellulose acetate butyrate containing 30–55% butyryl and having a viscosity of 5–75 seconds, a char point of at least 260° C. and 1–2 free hydroxyls per 24 carbon atoms in the cellulose unit and 70–100 parts of a plasticizer essentially consisting of an alkyl phthalate, the alkyl groups containing 4–6 carbon atoms, which laminated glass at 0° F. when the inner layer is .025″ thick resists the impact of a one-half pound steel ball dropped from a height of at least 15 feet.

2. Laminated glass containing an inner layer essentially consisting of 100 parts of cellulose acetate butyrate containing 30–55% butyryl and having a viscosity of 5–75 seconds, a char point of at least 260° C. and 1–2 free hydroxyls per 24 carbon atoms in the cellulose unit and 70–100 parts of a plasticizer essentially consisting of diamyl phthalate, which laminated glass at 0° F. when the inner layer is .025″ thick resists the impact of a one-half pound steel ball dropped from a height of at least 15 feet.

3. Laminated glass containing an inner layer essentially consisting of 100 parts of cellulose acetate butyrate containing 30–55% butyryl and having a viscosity of 5–75 seconds, a char point of at least 260° C. and 1–2 free hydroxyls per 24 carbon atoms in the cellulose unit and 70–100 parts of a plasticizer essentially consisting of dibutyl phthalate, which laminated glass at 0° F. when the inner layer is .025″ thick resists the impact of a one-half pound steel ball dropped from a height of at least 15 feet.

4. Laminated glass containing an inner layer essentially consisting of 100 parts of cellulose acetate butyrate containing 30–55% butyryl and having a viscosity of 5–75 seconds, a char point of at least 260° C. and 1–2 free hydroxyls per 24 carbon atoms in the cellulose unit and 70–100 parts of a plasticizer essentially consisting of di-2-ethyl butyl phthalate, which laminated glass at 0° F. when the inner layer is .025″ thick resists the impact of a one-half pound steel ball dropped from a height of at least 15 feet.

5. Laminated glass containing an inner layer essentially consisting of 100 parts of cellulose acetate butyrate containing 35–38% butyryl and having a viscosity of 5–75 seconds, a char point of at least 280° C. and 1–2 free hydroxyls per 24 carbon atoms in the cellulose unit and 70–100 parts of an alkyl phthalate, the alkyl having 4-6 carbon atoms, which laminated glass at 0° F. when the inner layer is .025" thick resists the impact of a one-half pound steel ball dropped from a height of at least 15 feet.

6. Laminated glass containing an inner layer essentially consisting of 100 parts of cellulose acetate butyrate containing 35-38% butyryl and having a viscosity of 5-75 seconds, a char point of at least 280° C. and 1-2 free hydroxyls per 24 carbon atoms in the cellulose unit and 70-100 parts of diamyl phthalate, which laminated glass at 0° F. when the inner layer is .025" thick resists the impact of a one-half pound steel ball dropped from a height of at least 15 feet.

7. Laminated glass containing an inner layer essentially consisting of 100 parts of cellulose acetate butyrate containing 35-38% butyryl and having a viscosity of 5-75 seconds, a char point of at least 280° C. and 1-2 free hydroxyls per 24 carbon atoms in the cellulose unit and 70-100 parts of dibutyl phthalate, which laminated glass at 0° F. when the inner layer is .025" thick resists the impact of a one-half pound steel ball dropped from a height of at least 15 feet.

FREDERICK R. CONKLIN.
JOSEPH D. RYAN.